(12) United States Patent
Lin

(10) Patent No.: US 7,117,632 B2
(45) Date of Patent: *Oct. 10, 2006

(54) MICROBE-MEDIATED METHOD FOR ATTRACTING MOSQUITOES AND APPARATUS THEREOF

(75) Inventor: Chih-Chieh Lin, Toucheng Township, Yilan County (TW)

(73) Assignee: BioWare Technology Co., Ltd., Taipei Hsien (TW)

(*) Notice: Subject to any disclaimer, the term of this patent is extended or adjusted under 35 U.S.C. 154(b) by 0 days.

This patent is subject to a terminal disclaimer.

(21) Appl. No.: 10/903,289

(22) Filed: Jul. 30, 2004

(65) Prior Publication Data

US 2005/0011110 A1    Jan. 20, 2005

Related U.S. Application Data

(63) Continuation-in-part of application No. 10/198,900, filed on Jul. 19, 2002, now Pat. No. 6,823,622, which is a continuation-in-part of application No. 10/005,559, filed on Nov. 8, 2001, now Pat. No. 6,508,032, which is a continuation-in-part of application No. 09/749,353, filed on Dec. 27, 2000, now Pat. No. 6,425,202.

(51) Int. Cl.
*A01M 1/10* (2006.01)

(52) U.S. Cl. .......................................... 43/122; 43/107

(58) Field of Classification Search ................. 43/107, 43/112, 113, 114, 122
See application file for complete search history.

(56) References Cited

U.S. PATENT DOCUMENTS

| | | | | |
|---|---|---|---|---|
| 2,113,409 A | * | 4/1938 | Niemeyer | 43/113 |
| 2,193,492 A | * | 3/1940 | Richardson | 43/107 |
| 3,796,001 A | * | 3/1974 | Jackson | 43/113 |
| 4,244,135 A | * | 1/1981 | Harwoods | 43/122 |
| 4,694,604 A | * | 9/1987 | Mitchell | 43/114 |
| 5,189,830 A | * | 3/1993 | Montemurro | 43/121 |
| 5,274,949 A | * | 1/1994 | Beaton | 43/113 |
| 5,339,563 A | * | 8/1994 | Job | 43/122 |
| 5,452,540 A | * | 9/1995 | Dowd et al. | 43/107 |
| 6,134,826 A | * | 10/2000 | Mah | 43/112 |

* cited by examiner

*Primary Examiner*—Kurt Rowan
(74) *Attorney, Agent, or Firm*—J.C. Patents

(57) ABSTRACT

The present invention provides an apparatus and method for attracting mosquitoes by using the microbe product as the mosquito bait as well as simulating the human emanated odors. A bait-releasing unit/means is included to enhance the release of the mosquito bait. A well-controlled heating assembly can be used to generate a suitable thermal gradient for simulating body temperature and evaporating the bait. The microbe product comprises at least a sterilized supernatant of a bacterial incubation product. The apparatus of this invention can further include electrocution grids or insecticide webs to destroy attracted mosquitoes.

9 Claims, 4 Drawing Sheets

MICROBE-MEDIATED METHOD FOR ATTRACTING MOSQUITOES AND APPARATUS THEREOF

CROSS-REFERENCE TO RELATED APPLICATION

This application is a Continuation-In-Part of Ser. No. 10/198,900, filed on Jul. 19, 2002 now U.S. Pat. No. 6,823,622, which is a Continuation-In-Part of Ser. No. 10/005,559, filed on Nov. 8, 2001, now issued as U.S. Pat. No. 6,508,032 B2, which is a Continuation-In-Part of Ser. No. 09/749,353, filed on Dec. 27, 2000, now issued as U.S. Pat. No. 6,425,202 B1, which claims the priority benefit of Taiwan application serial no. 90101427, filed Jan. 20, 2001.

BACKGROUND OF THE INVENTION

1. Field of Invention

The present invention relates to means for insect control. More particularly, the present invention relates to a microbe-mediated method of using a microbe product to attract mosquitoes for control purposes or for destroying mosquitoes.

2. Description of Related Art

Insect control has been in great demand throughout human history. It is necessary to control harmful insects like mosquitoes, to prevent the spread of disease, such as malaria and yellow fever. Public health authorities everywhere have expended intense effort on eliminating mosquito-related disease; however, this effort has not been wholly successful, largely because of the difficulty of eliminating mosquitoes. In addition to eliminating mosquito-related disease, another reason for eliminating mosquitoes is abatement of the nuisance caused by mosquito bites. Therefore, there has been a perennial call for means of effective mosquito control, including means to attract, capture, or destroy active mosquitoes.

Female mosquitoes seek a human host from which they obtain a blood meal for egg development. Mosquitoes locate hosts through a combination of chemicals characteristic of the hosts. It is believed that the volatiles emanating from the human host are responsible for the attractant. These volatiles contain 300–400 compounds and originate from either the secretions of skin glands, or the decomposition of the skin microflora, or both. The mosquitoes use their olfactory structures to detect the attractant from as far away as 90 meters.

Current methods of control only attack the mosquito population as a whole by chemical means or seek to remove their breeding sites. These methods are cumbersome, labor-intensive and often disruptive, in that they may introduce dangerous amounts of toxic chemicals into the environment. Some other attempts have been made to construct mosquito traps. For trapping mosquitoes, light, warmth, carbon dioxide, octenol, water vapor and lactic acid have all been used as attractants.

SUMMARY OF THE INVENTION

The invention provides a method for controlling mosquitoes by using the microbe product comprising bacterial fermentation products as the bait (containing mosquito attractants) for attracting the mosquitoes. This invention has combined heat and the mosquito bait (containing attractants) to achieve a highly efficient attraction. Furthermore, this invention is coupled with an attractant releasing mechanism, which enhances the release of the mosquito bait into the environment. The invention also comprises methods and means for trapping mosquitoes for control purposes or for destroying mosquitoes after attracting them.

Another objective of the present invention is to provide a method and apparatus for attracting mosquitoes with the microbe product mosquito bait, which can be applied for controlling or destroying mosquitoes. A well-controlled heating assembly can be used to generate a suitable thermal gradient for enhancing evaporation of the bait and simulating the human body's surface temperature. The release of the bait can be further enhanced by a bait-releasing unit. The bait comprises at least sterile bacterial fermentation (cultivation) products. The bait is not poisonous to human beings and contains mosquito attractants made from natural decomposition or metabolic products of bacterial fermentation or incubation. This invention can also combine with electrocution grids or insecticide webs to destroy gathered mosquitoes.

As embodied and broadly described herein, the present invention provides a fixed or portable mosquito controlling system for trapping mosquitoes, for use indoors or outdoors. The mosquito controlling system comprises at least a fixture for holding a container containing at least a sterile microbe bait including bacterial fermentation products, controllable heating means for generating heat, and/or electric grids or insecticide webs for killing mosquitoes.

As embodied and broadly described herein, the system of the present invention further includes a bait-releasing unit for boosting the release of the bait into the environment. The bait-releasing unit mainly utilizes atomization mechanisms (including means of spraying atomization or oscillation atomization) for spreading the bait as finely droplets (i.e. mist) into the environment. Alternatively, the bait-releasing unit can employ chemical means for assisting blowing the attractants. Therefore, the diffuse rate and evaporation rate of the bait in a certain space is increased, thus enhancing efficiency of the mosquito bait and increasing the effective distance for attracting mosquitoes.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
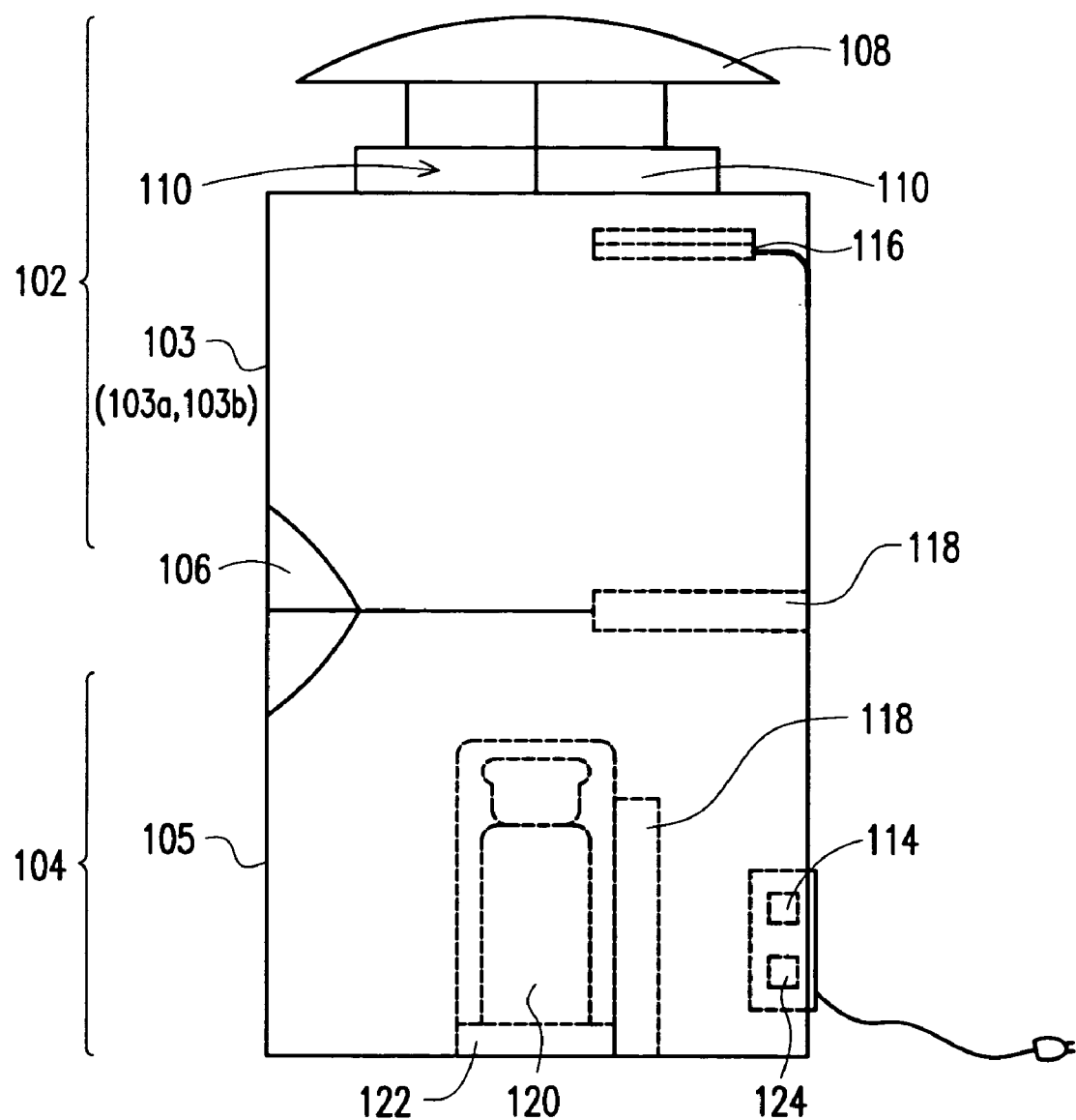
FIG. 1 is a schematic view of an apparatus for attracting mosquitoes according to one preferred embodiment of the present invention.

Some bacteria, existing in human sweat, are known to produce methanethiols that emanate as both cheese and foot odor. The microbes may be responsible for producing human odors from human perspiration. Evidence for direct microbial involvement in producing the volatile attractants in human hosts has been demonstrated by showing that incubation of sweat enhances its attraction. Therefore, it is very useful to identify these microbes and use these microbes for simulating human odors, as a means for attracting the haematophagous mosquitoes.

In this invention, the mosquito attractants include at least a human odor simulator (mosquito attractant) simulating human host volatiles. The human odor simulator is provided by bacterial decomposition or fermentation products of specific bacteria existing on the human skin surface.

Experimental Data:

Some experiments were applied to mosquitoes, described as following:

Mosquitoes The *Aedes aegypti* (Ping-Tung Taiwan strain or UGAL strain) were maintained and assayed at 23–25° C., 60–80% relative humidity, and 12 hrs light/12 hrs dark. Adults were kept in 30 cm$^3$ gauze-covered cages and fed with a 10% (v/v) sugar solution. In the bioassay of the 10–14 day-old females that had not received a blood meal were released into a dual-port olfactometer. The olfactometer consisted of a flight chamber (1.6 m×0.6 m×0.6 m) in which mosquitoes were released. Air pumped from the room source was filtered by activated carbon, respectively passed through two bottles of distilled water, and one of the two ports (5 cm diameter, 30 cm apart), and then released into the flight chamber. The odor source was placed in the port, where the temperature was kept at 30° C. by a water circulation system, while the room temperature was maintained at 23–25° C. The observation time of the bioassay was 15 minutes after releasing mosquitoes. All parts of the olfactometer were cleaned with 75% alcohol and blow with strong fans for 20 minutes between test series. In addition, to counteract the effect of any biased directional response of unknown origins, the positions of the treatment and control were alternated between ports after each test.

Bacteria Strains of two Coryneform bacteria, *Brevibacterium* (B.) *epidermidis* (BE) and *B. linens* (BL), purchased from Deutsche Sammlunig von Mikrooranismen and Zellkulturen GmbH, Braunschweig, Germany and Food Industry Research & Development Institute, Hsinchu, Taiwan, ROC, respectively, were used for bioassay. The bacteria were grown in four different mediums: TSB, MB, NB and BE. The ingredients of these mediums are listed as following: TSB (15 grams of tryptone+5 grams of soytone+5 grams of NaCl/liter, pH 7.3), MB (50 grams of milk powder+2.5 grams of peptone/liter, pH 7.2), NB (5 grams of peptone+1.5 grams of beef extract+1.5 grams of yeast extract+5 grams of NaCl/liter, pH 7.4), and BE (5 grams of beef extracts, pH 7.4), at 30° C., 200 rpm for two days.

In order to screen the different combinations of bacteria and medium for the highest efficiency of mosquito attraction, 4 ml of the 2-day-old bacterial cultures from different combinations were tested in the olfactometer.

As shown in Table 1, most Coryneform bacterial strains grown in any of these mediums can attract mosquitoes, though strain BE9585 that shows little attraction. Among them, strain BE9586 shows attraction with all the tested growing mediums, of which that cultured with the NB and BE mediums had the highest attraction percentage. In general, the attraction efficiency was not higher than 30% in the absence of the heating device.

TABLE 1

Bacterial cultures attracting adult female mosquitoes

| Strains | TSB | MB | NB | BE |
|---|---|---|---|---|
| BE20660 | +[a] | − | − | + |
| BE9585 | − | − | − | + |
| BE9586 | + | + | +++ | +++ |
| BE20659 | NA[b] | + | NA | ++ |
| BL20158 | − | ++ | NA | − |
| BL20425 | − | + | NA | − |
| BL20426 | + | + | + | NA |

[a]Degree of the mosquito attraction, approximately measured by percentage. "−" = no attraction, "+" = 10%, "++" = 20%, "+++" = 30%.
[b]Not available In order to further identify the attraction of strain BE9586 grown in the NB medium, the supernatant obtained from centrifugation of the bacterial culture was assayed in the olfactometer. Up to 86.7% of adult female mosquitoes were attracted toward the supernatant of the bacterial culture in an experiment. This percentage of attraction was approximately 20% higher than NB medium alone and 25% higher than blank solution without the odor source, such as water. It suggests that volatiles emanating from the bacterial culture product can exclusively attract adult female mosquitoes. In this assay, the heating itself showed 61.7% attraction, higher than previous non-heated odor sources. Possibly, the heating device provides heat stimulating human body heat so as to attract mosquitoes. In addition, the heating device may also function for better evaporation of the bacterial decomposition.

Bacterial fermentation products The exemplary preparation processes for the above bacterial fermentation (incubation) products are described as the follows. At first, autoclave the bacterial growth medium NB [0.5% (v/w) peptone+0.15% (v/w) beef extract+0.15% (v/w) yeast extract+5% NaCl] under 121° C., 1.5 atmosphere for 20 minutes. Next, transfer bacterial inoculum (O.D. 1.9, about 10$^9$ cells/cc) into the above sterilized growth medium in a 1:100 ratio (v/v) of inoculum to medium. Blend aliquots in a 2000 liter fermentor to grow bacteria for two days with the following parameters: initial pH 5.5, final pH 8.5, initial O.D. void, final O.D. 1.9 at the wave length of 600 nm, under a constant incubation temperature of 30° C., with air flow 0.2 liter/minutes and blend rotation of 100 rpm. Continuously centrifuge (5000×g for 10 minutes) to remove most of the bacterial cells after the fermentation (incubation). The obtained supernatant is autoclaved under 121° C., 1.5 atmosphere for 20 minutes for sterilization. The sterilized supernatant is diluted up to three times with sterilized distilled water and stored in 10% alcohol (v/w) as the final bacterial fermentation product.

While the above descriptions only provide an exemplary embodiment for fabricating bacterial fermentation products, other bacterial growth medium or other process conditions can also be used for preparation, depending on the requirements of the bacteria and the costs. In addition, the final bacterial fermentation product should have no biological hazards toward human beings or the ecological environment, since the bacterial fermentation product has been processed and sterilized.

A standard extraction procedure with different non-polar solvents was performed to identify the major ingredient of the attractant. Through using various non-polar solvents, the obtained extracts were vacuumed to dry by rotary vacuum evaporator and then re-dissolved in 10% alcohol water solution. The aforementioned sterilized supernatant is tested here as the non-extracted attractant. As shown in Table 2, extracts with three solvents of different polarity could retain most of the attraction when compared with the non-extracted attractant. Among these solvents n-Hexane provides the highest attraction rate toward mosquitoes, while n-Hexane, having a low polarity index of 0.1, could almost be considered as a non-polar solvent. The results indicate that non-polar volatiles dissolved in non-polar solvents could be metabolites of the bacterial cultures involved in the attraction. The solvents alone do not have attraction for mosquitoes. As encompassed within the scope of the present invention, the bacterial fermentation product can be produced from bacterial cultures using various culture mediums. The obtained supernatant is processed and sterilized, while subsequent extraction with non-polar solvents is optional.

TABLE 2

| SOLVENT | POLARITY INDEX | TRAPPED MOSQUITOES (%)* |
|---|---|---|
| n-Hexane | 0.1 | 61.3 |
| Dichloromethane | 3.1 | 52.7 |
| Ether | 2.8 | 48.7 |
| non-extracted attractant | — | 64.7 |
| Water alone | — | 37.3 |

*Total 30 female mosquitoes were released into the tested chamber. Only one set of the data from three independent trials was shown.

FIG. 1 is a schematic view of an apparatus for attracting mosquitoes according to one preferred embodiment of the present invention. Referring to FIG. 1, the apparatus 100 is divided into an upper compartment 102 and a bottom compartment 104, connected by a snap-in clip mechanism. Alternatively, the upper and the bottom compartments can be connected by other well-known fixation mechanisms, such as the tight-fit mechanism, screws or bolts. A shield 108 is connected to the top of the upper chamber 102 with a supporting means, such as a supporting stock with extension walls for leading mosquitoes into passing channels. The shield 108 is separated from the upper compartment 102 by a distance of about 1–2 cm. Preferably, a top (outer) surface of the shield 108 is tinged in bright colors, for not distracting mosquitoes. On the other hand, an inner surface of the shield 108 and the passing channels 110 are preferably colored in dark colors for attracting mosquitoes. Under the shield 108, the top of the upper compartment includes a plurality of passing channels 110 that open inward to the internal space of the upper chamber 102. The passing channels 110 have openings large enough for mosquitoes to pass through, while the channels 110 open inward to prevent the escape of incoming mosquitoes.

The upper compartment 102 includes a mosquito-destroying means, such as an electric grid 103a or a sticky pesticide web 103b. Preferably, the electric grid 103a is used to destroy the attracted mosquitoes. The electric grid 103a or the pesticide web 103b can be arranged on an upper casing 103 of the upper compartment 102 or be inlaid in the upper casting 103. Furthermore, the electric grid 103a or the pesticide web 103b can replace the upper casing 103 and be used to define (compartmentalize) the upper compartment 102. A collecting drawer 106 can be arranged between the upper compartment 102 and the bottom compartment 104, for collecting destroyed mosquitoes or fragments.

Referring to FIG. 1, the bottom compartment 104 includes an adjustable heating assembly 114, comprising a temperature-control means and/or a time-control means. The adjustable heating assembly 114 can be arranged in the upper compartment or in the bottom compartment, depending on the design of the system. The time-control means can set up an application time based on the user's schedule. The temperature-control means can generate heat to a specific (set-up) temperature and maintain the temperature, and comprises, for example, at least a heater 116 that is controlled by a logic circuit. The metallic heater 116 is preferably placed within the upper compartment 102 for enhancing its effects in attracting mosquitoes. The adjustable heating assembly 114 can generate a regulated thermal gradient for simulating human body heat and enhancing evaporation of the bacterial decomposition products.

The apparatus 100 includes a bait-releasing unit 118, for boosting the release and diffuse of the bait. The bait-releasing unit 118 can be arranged inside the bottom compartment, or between the upper and the bottom compartment.

The bottom compartment 104 is hollow and defined by a lower casing 105, while the lower casting 105 may be two pieces or one integral piece, hallow and shaped as a canopy or upside-down cup.

The apparatus 100 includes a container 120 that is placed inside the bottom compartment 104 and on the bottom of the bottom compartment 104. The container 120 at least comprises host odor simulators, for example, bacterial incubation (fermentation) products. After incubating specific microbes (bacteria) with cultivating mediums, bacteria can generate metabolic products or decompose the cultivating medium so as to produce bacterial decomposition or fermentation products. The container 120 can be designed to be a bottle, a tube, a box, a well, a vassal or a cassette, depending on the state of the bacterial fermentation products.

The container 120 is mounted on the center of a fixture 122. The fixture 122 is coupled to the base of the lower casting 105, so that the container 120 is located inside the bottom compartment 104. The fixture 122 together with the locked container 120 are removable (replaceable) and can be dismantled from the base of the lower casting 105, so that the container 120 can be refilled or replaced. In addition, a power source 124 is included within the bottom compartment 104 for providing electric power for the electric grid 103a and/or the heating assembly 114, or even the bait-releasing unit 118. The power source 124 is either powered through batteries or coupled to a DC power source by a plug.

Preferably, Coryneform bacterial strains and cultivating conditions used in previous experiments are used to prepare the bacterial fermentation product. For example, strain BE9586 grown in the NB medium [5 grams of peptone+1.5 grams of beef extract+1.5 grams of yeast extract+5 grams of NaCl/liter] is used to provide bacterial fermentation products. The obtained bacterial products can be modified as jelly-like gels, powders, solids or various solutions depending on the requirements. Preferably, the bacterial product is in liquid sate, suitably applicable for the bait-releasing unit.

Experiments performed by the inventors for the effect of heat combined with odor simulators on the mosquito species *Aedes aegypti* showed that bacterial fermentation product along with heat evaporation could attract 60% of the mosquitoes. Using bacterial fermentation product as the mosquito bait attracts more mosquitoes in a certain period when compared with other baits, probably due to the dominant influence of odors in host-seeking behavior of mosquitoes.

Nevertheless, water or culture medium can be considered as mosquito baits, since they showed some attraction toward mosquitoes in previous experiments.

Bait-releasing Unit

In accordance with the present invention, the previously described method and apparatus further comprise bait-releasing means/a bait-releasing unit for enhancing the release and diffusion of the mosquito bait. The bait-releasing means, for example, utilizes atomization mechanism (such as spraying atomization or oscillation atomization mechanisms) for spreading the bait as finely droplets (e.g. with a diameter of about 5–50 microns) into the environment. Therefore, the diffuse rate and evaporation rate of the bait in a certain space is increased, thus enhancing efficiency of the mosquito bait and increasing the effective distance for attracting mosquitoes. Based on the experimental results, the attraction efficiency (based on the capture rate) is increased from 30% (without the bait-releasing unit) to about 90% (with the bait-releasing unit).

The apparatus 100 shown in FIG. 1 includes a bait-releasing unit 118, for boosting the release and diffuse of the bait. The bait-releasing unit 118 can be arranged inside the bottom compartment, or between the upper and the bottom compartment. In fact, the bait-releasing unit 118 is merely an example of various bait-releasing means provided by the present invention. The following descriptions will explain various bait-releasing mechanisms applicable for the bait-releasing unit of this invention.

Figure 2:
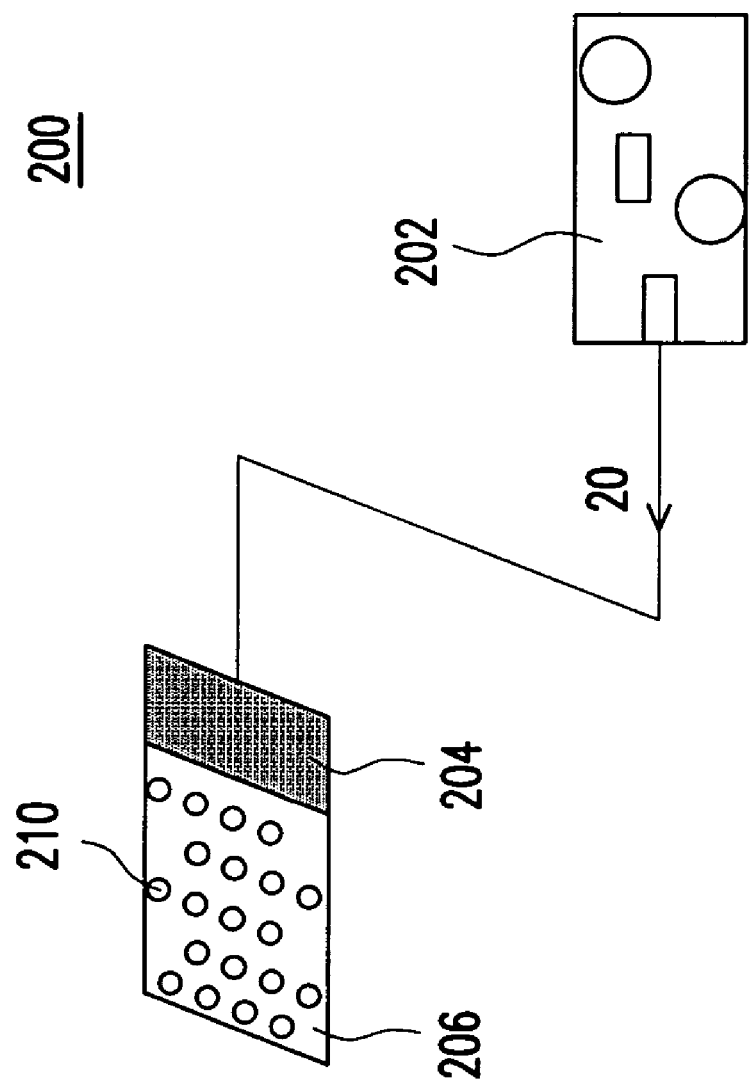
FIG. 2 is a schematic view of a bait-releasing unit according to one preferred embodiment of the present invention.

According to one preferred embodiment, the bait-releasing unit 200 is based on the high frequency oscillation atomization mechanism. FIG. 2 is a schematic view of the bait-releasing unit. The bait-releasing unit 200 can be disposed between the upper and the bottom compartment of the aforementioned apparatus or mounted on the top of the lower casting. The bait-releasing unit 200 at least includes a circuit control panel (or IC chip) 202 for providing power and controlling the time and oscillation frequency, a piezo-electric ceramic plate 204 electrically connected to the control panel 202 and a vibration plate 206 connected to the ceramic plate 204. The piezo-electric ceramic plate 204 can provide stable oscillation frequency, for example, 1.9 kHz frequency. The vibration plate 206 is, for example, a rust-proof metallic sheet with a plurality of holes 210 with sizes of about 5–20 microns. The bait solution can be transferred from the container 120 of FIG. 1 to the holes 210 by capillary reaction (e.g. being transferred via a wick). After transmitting a supersonic signal 20 to the piezo-electric ceramic plate 204, the ceramic plate 204 oscillates rapidly and makes the plate 206 to vibrate along with the ceramic plate 204 rapidly. Because the fast vibration of the plate 206 transferred to the bait solution within the holes 210 destroys the surface tension of the liquid (bait solution), the bait solution is atomized and spread out as fine droplets (i.e. mists). Therefore, the bait can be easily scattered around and diffused to the upper compartment or outside the apparatus.

The bait-releasing unit can employ different mechanisms for assisting the diffuse of the bait or the bacterial fermentation product, based on various factors including the costs, indoor or outdoor use, the position of the bait-releasing unit within the whole apparatus etc. In the following embodiment, the bait-releasing unit employs the spraying atomization mechanism.

Figure 3A:
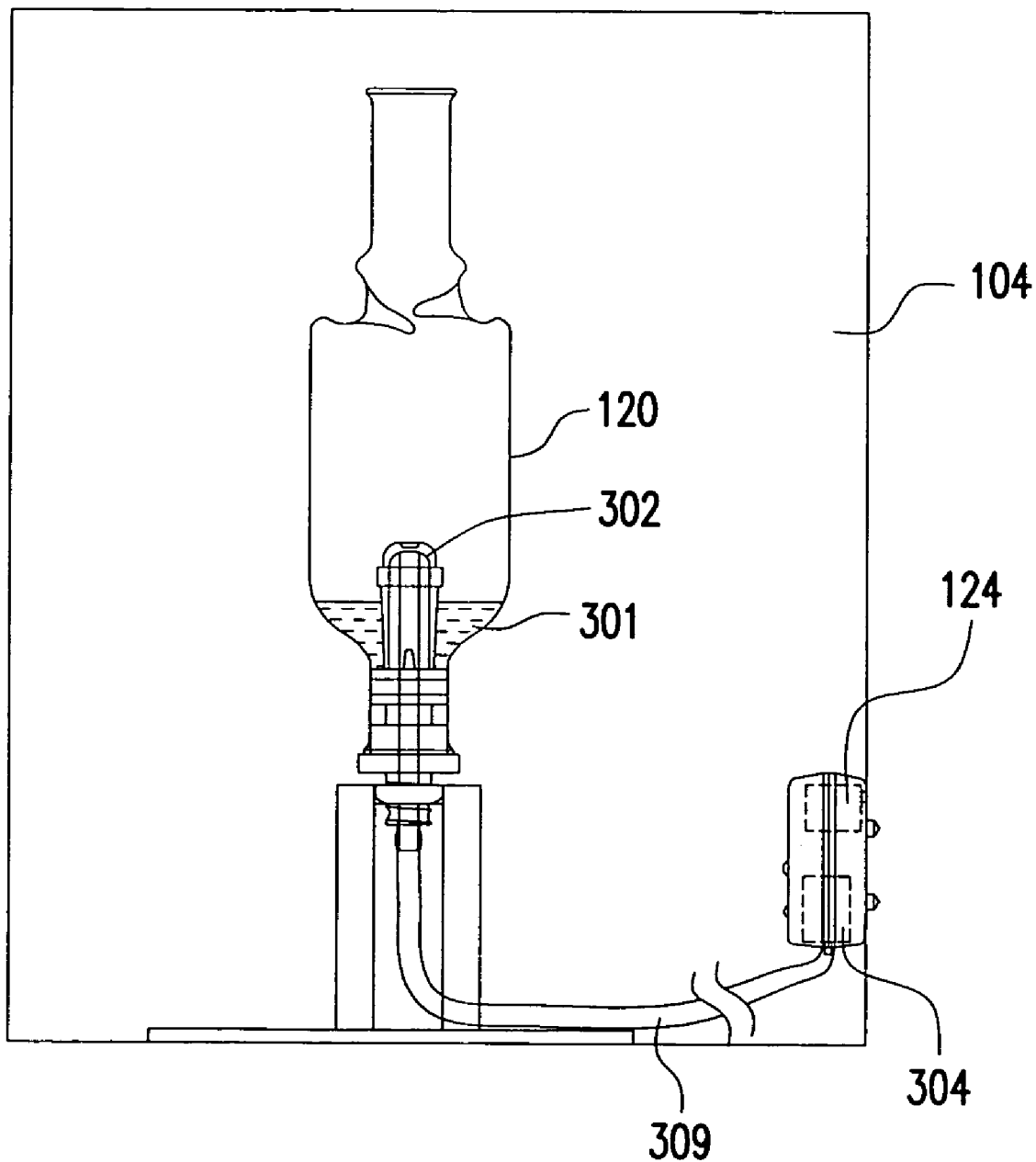
FIG. 3A is a schematic view of a bait-releasing unit according to another preferred embodiment of the present invention.

FIG. 3A is a schematic view of a bait-releasing unit according to another preferred embodiment of the present invention. The bait-releasing unit 300 can be disposed in the container of aforementioned apparatus (FIG. 1), or inside the bottom compartment. Referring to FIG. 3A, the bait-releasing unit 300 comprises at least a spray nozzle 302, for example, made of stainless steel, and a small air pump 304. The bait-releasing unit 300 is attached to the container 120 through the lock-up mechanism or screw/bolted joined mechanism. The air pump 304 can be replaced by an air cartridge or by other air pumping mechanisms with similar functions. The mosquito bait is filled within the container and should not cover the top of the spray nozzle 302. Preferably, the bait is in liquid state, and the top of the spray nozzle 302 should not be sunken by the liquid. Take advantage of siphonage, the spray nozzle 302 can lead the liquid bait surrounding the nozzle to the top of the nozzle and spray out the bait as fine mist.

Figure 3B:
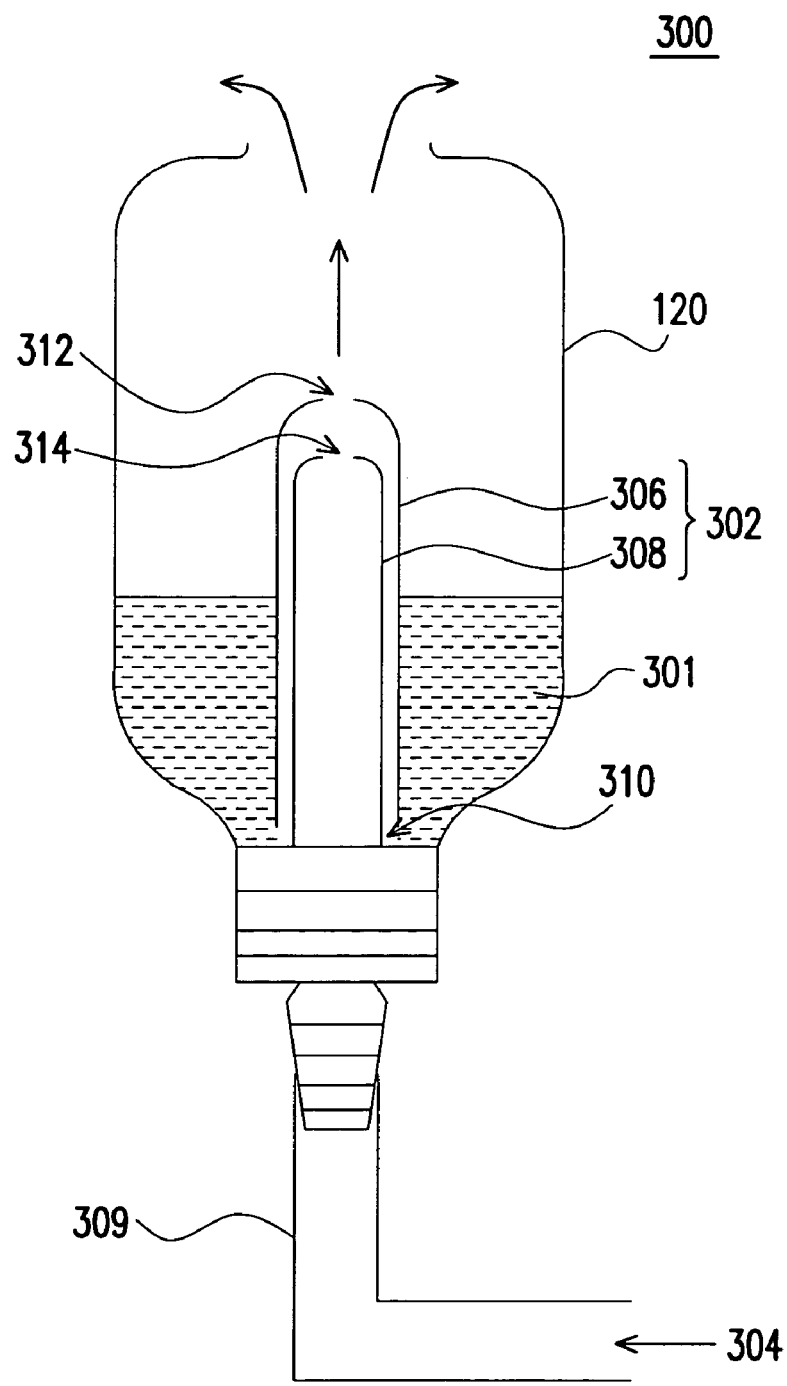
FIG. 3B is a partially enlarged view of the unit shown in FIG. 3A.

FIG. 3B is a partially enlarged view of FIG. 3A. As shown in FIG. 3B, the spray nozzle 302, for example, made of a stainless steel, comprises an outer tube 306 and an inner tube 308 that is telescoped into the outer tube 306. The air pump 304 pressurizes air through tubing 309 into the inner tube 308 of the spray nozzle 302. Because the outer tube 306 is immersed in the mosquito bait (in a liquid form) and a crevice 310 is in the bottom of the outer tube 306, the liquid mosquito bait can be siphoned up to a cap 312 of the spray nozzle 302. The air pressurized into the inner tube 308 then ejects at a high speed through a small hole 314, thus spraying out the mosquito bait in a form of very fine droplets (shown as arrow in FIG. 3B). The droplets have an average diameter of about 5–50, microns, for example. Therefore, the bait is turned to a mist that is volatile and easily diffusive.

According to the present invention, the container 120 can be designed to have a baffle around the opening of the container, so as to prevent large droplets of the bait from spreading out and only allow fine droplets of the bait being released into the environment.

For the above embodiments, since certain elements including the power supply, heater, pump and tubing are well known to the art, no further details are provided.

Accordingly, the bait-releasing unit sprays out the mosquito bait in the form of fine droplets, so that the diffuse rate and evaporation rate of the bait in a certain space are increased, thus increasing the effective distance for attracting mosquitoes and boosting efficiency of the mosquito bait to a maximum.

Alternatively, the bait-releasing unit can simply be a spray can or sprayer, using the pressure difference to generate fine mist.

Furthermore, instead of the spraying atomization or oscillation atomization mechanisms of the aforementioned bait-releasing means, a foam blowing mechanism can also be used to help spreading out the mosquito bait. Through chemical reactions between specific foaming agents with solutions, gases, for example, carbon dioxide, can be produced to blow the mosquito bait into the surrounding environment. Altenatively, volatile solvents, such as, alcohols, can be added to the bait. Therefore, it boosts the release of the bait and reinforces the attraction toward mosquitoes. One of the advantages of this foam blowing mechanism is no electrical power is required, thus suitable for outdoor usage in combination with pesticide or sticky materials.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of attracting mosquitoes by using a bacterial fermentation product, wherein the method comprises:
   providing a mosquito bait for attracting mosquitoes, wherein the mosquito bait comprises at least a sterilized supernatant of the bacterial fermentation product;
   providing a bait-releasing means for enhancing the release of the mosquito bait, wherein the bait-releasing means atomizes the mosquito bait as fine droplets to speed up emanation of mosquito attractants from the mosquito bait, the mosquito attractants comprising at least a combination of odors from the sterilized supernatant of the bacterial fermentation product.

2. The method as claimed in claim 1, wherein the method further comprise providing heat for the mosquito bait for helping evaporation of the mosquito bait, and wherein the heat simulates a body temperature and acts as an attractant for mosquitoes.

3. The method as claimed in claim 1, wherein a strain of Coryneform bacteria is used for producing the bacterial fermentation product.

4. The method as claimed in claim 3, wherein the sterilized supernatant of the bacteria fermentation product includes a non-polar solvent extract of the sterilized supernatant of the bacteria fermentation.

5. The method as claimed in claim 1, wherein the bait-releasing means comprises spraying the mosquito bait by using an air pump, to help spreading the mosquito bait.

6. The method as claimed in claim 1, wherein the bait-releasing means comprises atomizing the mosquito bait through vibration of a vibration plate, to help spreading the mosquito bait.

7. The method as claimed in claim 1, wherein the bait-releasing means comprises spraying the mosquito bait by using a spray can, to help spreading the mosquito bait.

8. The method as claimed in claim 1, wherein the bait-releasing means comprises blowing the mosquito bait by using a foaming agent to generate a gas, to help spreading the mosquito bait.

9. The method as claimed in claim 1, wherein the bait-releasing means comprises adding a volatile solvent to the mosquito bait, to help spreading the mosquito bait.

* * * * *